United States Patent [19]

Grosshandler

[11] 4,136,034
[45] Jan. 23, 1979

[54] LOW PRESSURE HIGH VOLUME FILTER APPARATUS

[75] Inventor: Sandor Grosshandler, Middleburg Heights, Ohio

[73] Assignee: The Dow Chemical Company, Midland, Mich.

[21] Appl. No.: 854,932

[22] Filed: Nov. 25, 1977

[51] Int. Cl.² .................. B01D 25/02; B01D 29/02
[52] U.S. Cl. .................... 210/346; 210/350; 210/352; 210/385; 210/447; 55/351; 55/353
[58] Field of Search ............. 210/241, 324, 328, 329, 210/330, 385, 447, 346, 350, 352; 55/351, 353, 493, 497, 502

[56] References Cited

U.S. PATENT DOCUMENTS

| | | | |
|---|---|---|---|
| 1,925,793 | 9/1933 | Dahlman | 55/493 |
| 2,201,628 | 5/1940 | McCormick et al. | 210/328 |
| 2,340,592 | 2/1944 | Holm et al. | 210/385 |
| 2,463,723 | 3/1949 | Spraragen | 183/62 |
| 2,907,408 | 10/1959 | Engle et al. | 55/497 |
| 3,221,887 | 12/1965 | Schade | 210/327 |
| 3,249,228 | 5/1966 | Arvanitakis | 210/346 |
| 3,470,680 | 10/1969 | Avera | 55/497 |

Primary Examiner—Charles N. Hart
Assistant Examiner—David R. Sadowski

[57] ABSTRACT

A high volume low pressure drop filter is provided which comprises a housing containing a plurality of filter panels hinged in accordian form. The filter panels in filtering position have an upwardly facing V-configuration. The panels are readily replaced by moving the active panels into an inactive position and drawing a fresh pair of panels into the position occupied by the panels which were removed.

4 Claims, 6 Drawing Figures

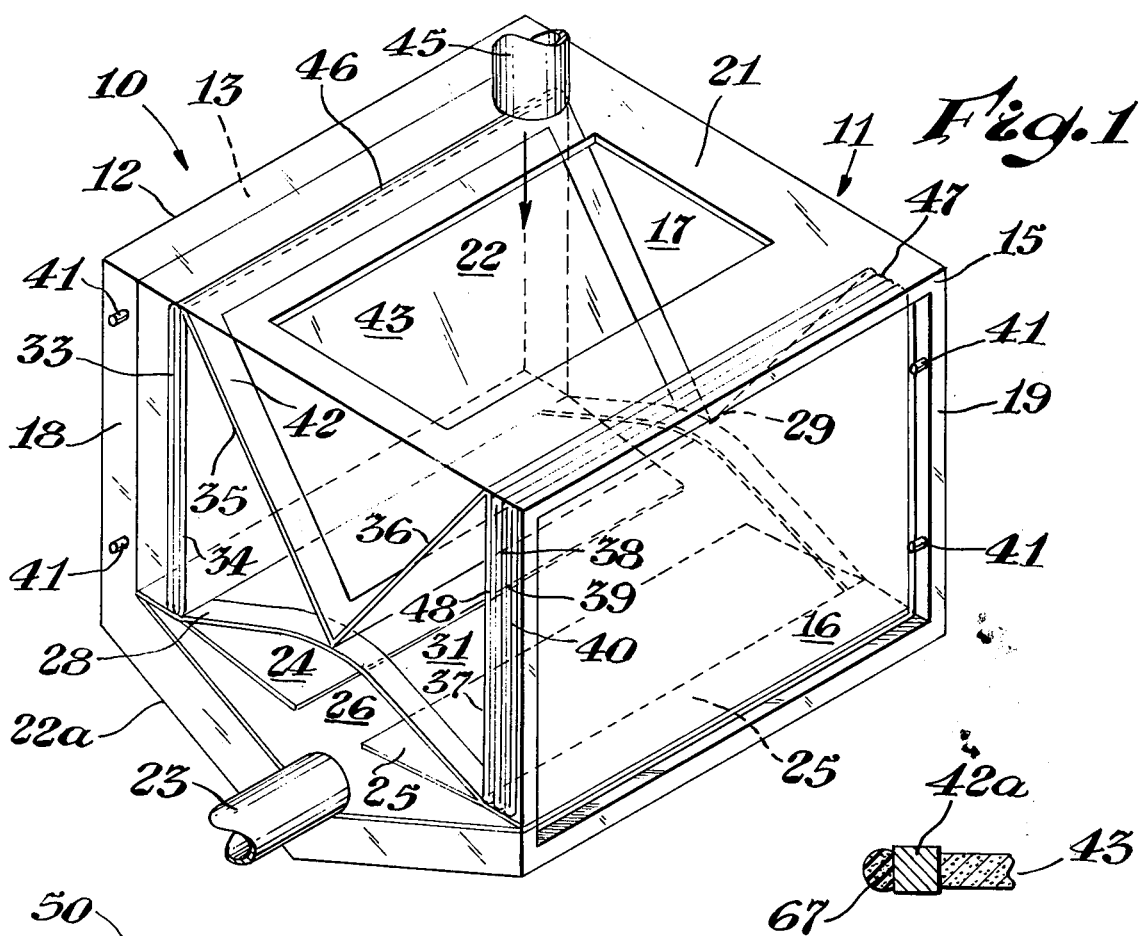
*Fig. 1*
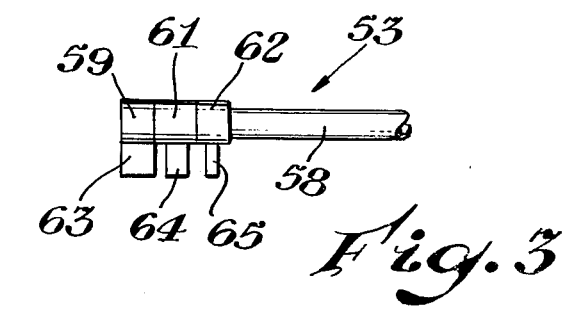
*Fig. 2*
*Fig. 3*
*Fig. 4*
*Fig. 5*
*Fig. 6*

LOW PRESSURE HIGH VOLUME FILTER APPARATUS

Oftentimes, it is desirable to have available low pressure drop relatively high volume capacity filters, for example, as a polishing filter for industrial wastes such as might be encountered in steel mills, refineries, chemical plants, and the like. Such filters are generally required to handle relatively large volumes of waste fluid such as water or gas at low pressure drops. Oftentimes, it is desirable to have available a filter which permits continuous flow of the waste fluid while permitting change or replacement of the filter element. In many filters, such filter element change is not readily accomplished.

It would be desirable if there were available an improved high volume low pressure drop filter.

It would be desirable if there were available an improved high volume low pressure filter in which the filter elements could be changed without significantly disrupting flow through the filter.

It would also be desirable if there were available such an improved filter wherein the filter element could be changed quickly with minimal labor.

These features and other advantages in accordance with the present invention are achieved in a filter assembly, the filter assembly comprising a hollow housing of generally rectangular configuration, the housing having a first open end and a second open end, the housing defining a generally rectangular channel extending from the first end to the second end, the housing defining a generally upward facing fluid receiving opening in full communication with the generally rectangular passage, the housing defining a bottom, a drain or discharge means disposed in said bottom, first and second guide means disposed within the housing and extending generally from the first end to the second end, the guide means being positioned generally adjacent the bottom of the housing and projecting inwardly into the generally rectangular passage, the guide means supporting a plurality of filter panels of a generally rectangular configuration, the panels being a sliding fit within the rectangular passage, the panels comprising a generally rectangular frame surrounding a fluid permeable filter membrane, adjacent panels being alternately joined at an upper hinge line and a lower hinge line, both hinge lines extending transversely in the rectangular passage in such a manner that the upper hinge line is disposed adjacent the top of the housing and the lower hinge line being disposed generally adjacent the bottom of the housing, a plurality of generally fluid impermeable sheet-like members pivotally affixed between adjacent filter panels at the upper hinge lines thereby providing a high volume low pressure drop filter element wherein pairs of filter panels joined at the lower hinge line are disposed beneath the fluid receiving opening in the top of the housing and serve to filter fluid passing into the fluid receiving opening flowing through the panels and out of the fluid discharge.

These benefits and other advantages in accordance with the present invention will become more apparent from the following specification taken in connection with the drawing wherein:

FIG. 1 is a schematic isometric representation of a filter with a transparent housing in accordance with the invention;

FIG. 2 is a schematic fractional side view of a plurality of filter elements and impermeable sheets such as are employed in the filter of FIG. 1;

FIG. 3 depicts schematically the manner of hinging of the various elements depicted in FIG. 2;

FIG. 4 is a schematic fractional, sectional view of a filter element in accordance with the invention depicting edge configuration; and FIGS. 5 and 6 schematically depict movement of filter panels such as the filter panels of FIG. 1 to position fresh panels under the liquid receiving opening.

In FIG. 1 there is schematically illustrated a filter assembly in accordance with the present invention generally designated by the reference numeral 10. The filter assembly 10 comprises a hollow generally rectangular housing 11 which as depicted in FIG. 1 is shown as transparent to facilitate illustration. The housing 11 has a first end 12 having a generally rectangular opening 13 therein, and a second end 15 having defined therein a generally rectangular opening 16. The housing 11 has defined therein a generally rectangular passageway 17 extending from the first end 12 to the second end 15. The passageway 17 is in full communication with the openings 13 and 16. The housing 11 has a first side 18 and a second side 19, the sides 18 and 19 being disposed in generally parallel spaced-apart relationship. The housing 11 has a top 21 connecting the sides 18 and 19 and defining therein a liquid entrance passageway or opening 22. The housing 11 has a bottom 22a of a generally convex outward configuration having disposed therein a drain conduit 23 in full communication with the passageway 17. Within the passageway 17 of the housing 11 is disposed a first liquid deflector 24 extending inwardly and downwardly into the housing 11. The deflector 24 is of generally planar configuration. A second deflector 25 is disposed within and supported by the housing 11. The second deflector 25 extends generally inwardly and downwardly toward an adjacent edge of the first deflector 24. A space 26 is defined between adjacent edges of the first deflector 24 and the second deflector 25. The deflectors 24 and 25 are in spaced relationship to the bottom 22a. First guide means 28 is disposed within the housing 11. The guide means 28 extends from a location generally adjacent the first end 12 to the second end 15. The guide means 28 has a generally convex upward configuration. A second guide means 29 is disposed on the second side 19 within the housing 11 generally adjacent the bottom 22a and above the first and second deflectors 24 and 25. The guide means 28 and 29 are generally symmetrically disposed about a vertical plane intersecting a longitudinal axis of the passageway 17. The guide means 28 and 29 define therebetween a filtered fluid passage 31 at a location generally which is centrally disposed in a plan view of the housing 11. A plurality of filter panels 33, 34, 35, 36, 37, 38, 39 and 40 are disposed within the passageway 17. A plurality of removable pins 41 pass through the sides of housing 11 provide a filter panel retaining means adjacent each of the openings 13-16. The filter panels 33 through 40 are of generally identical construction, each panel comprising a hollow rectangular frame such as the frame 42 of panel 35. The hollow frame 42 supports therein a fluid-permeable foraminous filter member 43. The panels 33 through 40 are hinged together at either locations adjacent the top 21 of the housing or locations adjacent the bottom 22a of the housing 11. Fluid-impermeable sheets are disposed between adjacent panels which are hinged together at locations adjacent the top 21 of the housing 11. These sheets have been omitted for clarity. A source 45 is disposed above the opening 22 of top 21 and adapted to deliver thereto a stream of fluid such as water to be filtered through filter panels 35 and 36. Flexible sealing elements 46, 47, 48 and 49 are affixed to the housing 11 and sealingly engage adjacent panel edges. Such sealing elements conveniently may be sheet or sponge rubber, or other material suitable for the particular material being filtered.

In FIG. 2 there is a fractional side view of a plurality of filter panels suitable for use in a filter such as filter 10 of FIG. 1. The plurality of filter panels are generally designated by the reference numeral 50. The plurality of panels comprises a first panel 51 which has an upper end 52 which is affixed to a hinge or pivot 53; the hinge 53 has affixed thereto an upper end 52a of a filter panel 51a. A liquid-impermeable panel 54 is affixed to the hinge 53 between and generally coextensive with panels 51 and 51a. The panels 51, 51a and 54 are each independently movable about the axis of the hinge 53. A panel 51b is disposed adjacent the panel 51a and a lower edge 55 of the panel 51a is pivotally affixed to a lower edge 55a of panel 51b by means of a hinge or pivot 53a. A flexible liquid seal 56 also joins the lower edges 55 and 55a of panels 51a and 51b. Panel 51b has an upper edge 52c which is affixed to a hinge 53b. The hinge 53b carries a fluid-impermeable plate 54a and a filter panel 51c affixed to the hinge 53b in the same manner of connection as used with panels 51 and 51a. Filter panels or plates are affixed to each other in the accordian-fold manner shown and hereinbefore described until the desired number of panels is employed for the particular filter application.

In FIG. 3 there is depicted a fractional side view of one end of a hinge such as the hinge 53 of FIG. 2. The hinge comprises a shaft or pivot pin 58 having pivotally disposed thereon three rotatable bosses 59, 61 and 62. The bosses 62 have lugs 63, 64 and 65. The lugs 63, 64 and 65 in operation are adjacent to filter plates such as 51, impermeable plate 54 and filter plate 51a, respectively. The remaining end, the hinge 53 is of like construction. The order of attachment is exemplary and is not critical to the operation of the invention as to which lug is attached to any particular plate.

In FIG. 4 there is schmatically depicted a fractional, sectional view of a filter plate frame designated by the reference numeral 42a having a filter element 43 supported therein and a flexible deformable sealing gasket 67 affixed to the external side edge of the frame 42a. The flexible deformable gasket, for example, flexible sponge rubber, polyethylene, or the like, engages the surface of the passageway 17 to prevent significant flow of liquid about a filter element such as the filter element 43.

FIG. 5 schematically depicts movement of filter plates or elements in a filter of the present invention. In FIG. 5 a line A represents the location of the opening 43 relative to the filter plates when filtering. When it is desired to change plates, force is applied at a location generally indicated by the arrow. Such force moves the plates to a location as depicted in FIG. 6. Force is then applied to the upper hinge line of the adjacent plates as indicated by the arrow and the plates are then positioned as indicated in FIG. 5. Plates on either end of the plates being operated upon in FIGS. 5 and 6 are not shown.

In operation of a filter in accordance with the present invention such as the filter 10 of FIG. 1, a fluid such as water to be filtered is provided from the source 45 and passes into the passageway 17 through passageway 22. At least a major portion of the fluid is held in a space defined by the walls 18 and 19 of passageway 17 and filter elements or plates 35 and 36. The fluid or liquid such as water passes through the plates 35 and 36 falling onto the deflectors 24 and 25, runs onto the bottom 22 of the housing 11 and is discharged through the conduit 23. Employing the arrangement of filter plates as depicted in FIG. 2, in the filter of FIG. 1, the gasket 67 prevents significant flow of the fluid around the edges of the plates and forces the fluid through the foraminous region such as the region 43 and a similar region in filter element 36. At such time when the filter elements being used are no longer suitable, that is, have accumulated an undesirable quantity of solid material, clean filter plates are moved into position generally in the manner disclosed in FIGS. 5 and 6 wherein force is exerted against the lower portion of plate 36 to move the upper portion of plate 35 generally toward the center of opening 22 and the upper portion of filter element or plate 35, moved toward the second end 19 to position filter elements 33 and 34 beneath the opening 22. Beneficially, the fluid impermeable plates such as the plates 54 and 54a prevent movement of fluid coming through the filter element being used into the filter elements not being used. Employing an apparatus in accordance with the present invention, the clean filter plates may be attached to the accordian-fold assembly at one end of the housing 11 and then the clogged or dirty filter plates may be removed at the opposite end of the housing; thus, a desirably clean filter media may be maintained in the path of a stream flowing from source 45 with little or no interruption in the flow and no time-consuming delays while filter elements are being changed.

Filters in accordance with the present invention are readily fabricated from materials generally employed for the manufacture of filters. Such materials include wood, metals such as carbon steel, stainless steel and the like, as well as various so-called plastic materials which include both thermoplastic and thermosetting resins. This selection of the particular material or materials employed is well within the skill of a person familiar with the fabrication of filters. Such filters are readily assembled by welding, bolting, gluing and like well known methods of assembly. The porous or permeable filter elements may be of any porous material suitable for the particular end-use application.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A filter assembly, the filter assembly comprising a hollow housing of generally rectangular configuration, the housing having a first open end and a second open end, the housing defining a generally rectangular channel extending from the first end to the second end, the housing defining a generally upward facing fluid receiving opening in full communication with the generally rectangular passage, the housing defining a bottom, a discharge means disposed in said bottom, first and second guide means disposed within the housing and extending generally from the first end to the second end, the guide means being positioned generally adjacent the bottom of the housing and projecting inwardly into the generally rectangular passage, the guide means supporting a plurality of filter panels of a generally rectangular configuration, the panels being a sliding fit within the rectangular passage, the panels comprising a generally rectangular frame surrounding a fluid-permeable filter membrane, adjacent panels being alternately joined at an upper hinge line and a lower hinge line, both hinge lines extending transversely in the rectangular passage in such a manner that the upper hinge line is disposed adjacent the top of the housing and the lower hinge line being disposed generally adjacent the bottom of the housing, a plurality of generally fluid-impermeable sheet-like members pivotally affixed between adjacent filter panels at the upper hinge lines thereby providing a high volume low pressure drop filter element wherein pairs of filter panels joined at the lower hinge line are selectively slidably disposed beneath the liquid receiving opening in the top of the housing and serve to filter liquid passing into the liquid receiving opening flowing through the panels and out of the liquid discharge.

2. The filter assembly of claim 1 wherein a flexible gasket is disposed between adjacent filter plates generally at the lower hinge line.

3. The filter assembly of claim 1 wherein the filter panels have a flexible gasket disposed thereon adjacent sides of the generally rectangular passage.

4. The filter assembly of claim 1 wherein the guide means have a generally convex upward configuration.

* * * * *